US006954655B2

United States Patent
Rudrapatna et al.

(10) Patent No.: US 6,954,655 B2
(45) Date of Patent: Oct. 11, 2005

(54) ENCODING SYSTEM FOR MULTI-ANTENNA TRANSMITTER AND DECODING SYSTEM FOR MULTI-ANTENNA RECEIVER

(75) Inventors: Ashok N. Rudrapatna, Basking Ridge, NJ (US); Naresh Sharma, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 678 days.

(21) Appl. No.: 10/004,024

(22) Filed: Nov. 16, 2001

(65) Prior Publication Data

US 2003/0096636 A1 May 22, 2003

(51) Int. Cl.$^7$ .............................................. H04M 1/00
(52) U.S. Cl. .................... 455/562.1; 455/103; 455/561; 455/101; 370/334; 375/267; 375/299
(58) Field of Search ................................ 455/101–103, 455/561.5, 62.1; 375/267, 299; 370/334; 343/853

(56) References Cited

U.S. PATENT DOCUMENTS

| 6,748,024 | B2 | * | 6/2004 | Kuchi et al. ................. 375/299 |
| 6,775,260 | B1 | * | 8/2004 | Dabak et al. ................ 370/342 |
| 2002/0118770 | A1 | * | 8/2002 | Foschini et al. ............. 375/267 |
| 2003/0048857 | A1 | * | 3/2003 | Onggosanusi et al. ....... 375/267 |
| 2003/0087673 | A1 | * | 5/2003 | Walton et al. ............... 455/562 |

FOREIGN PATENT DOCUMENTS

| EP | 1207645 A1 | * | 5/2001 |
| EP | 1223702 A1 |   | 7/2002 |
| FR | 1069707 A1 | * | 7/1999 |
| WO | WO 00/14927 |   | 3/2000 |

OTHER PUBLICATIONS

"Double–STTD scheme for HSPDA systems with four transmit antennas; Link Level Simulation Results." TSG–RAN Working Group 1 meeting #20; May 21–25, 2001, Busan, Korea, pp. 1–16.

Huang, Howard et al. "Multiple Antenna and Multiuser Detection in High Data Rate CDMA Systems." 2000 IEEE, VTC 2000, Tokyo, Japan, pp. 556–560.

* cited by examiner

Primary Examiner—Nick Corsaro
Assistant Examiner—Sujatha Sharma

(57) ABSTRACT

The encoding system includes a feed unit receiving data and producing N data streams, where N is at least two. Each of N encoders receives a respective one of the N data streams and produces an encoded data stream. A multiple input multiple output (MIMO) encoder receives the N encoded data streams and encodes the N encoded data streams into M output data stream for transmission by M transmit antennas, where M is at least two. In the decoding system, a MIMO decoder receives T data streams from T receive antennas and decodes the T data streams into the N encoded data streams. Each of N decoders receives a respective one of the N encoded data streams from the MIMO decoder and produces N decoded data streams. A combiner combines the N decoded data streams into an output data stream.

16 Claims, 1 Drawing Sheet

ENCODING SYSTEM FOR MULTI-ANTENNA TRANSMITTER AND DECODING SYSTEM FOR MULTI-ANTENNA RECEIVER

BACKGROUND OF THE INVENTION

1. Field of the Invention

The present invention relates to the field of telecommunications; and more particularly, an encoding and decoding systems for a multi-antenna transmitter and multi-antenna receiver, respectively.

2. Description of Related Art

Many of the new multiple antenna schemes proposed for high-speed wireless communication involve dividing the data for transmission into a number of streams equal to the number of antennas. An encoder is associated with each antenna, and each encoder encodes the data stream being sent to the associated antenna. As such, independently encoded data streams are sent from each of the transmit antennas and then canceling of the interference between the streams at the receiver is performed before decoding. While using multiple antenna schemes allows for an increase in the data transmission rate (often called throughput), a constant demand exists for ways of increasing the data transmission rate.

SUMMARY OF THE INVENTION

The encoding system according to the present invention produces greater throughput by using a multiple input multiple output (MIMO) encoder to encode output from individual encoders into a number of data streams for transmission. According to the invention, data is divided into N data streams and encoded by N encoders. The MIMO encoder then encodes the N encoded data streams into M output streams. The M output streams are then transmitted by M antennas.

The number of encoders, N, can be less than, greater than or equal to the number of output streams, M. In one embodiment, N is 2, M is 4 and the MIMO encoder uses the double space time transmit diversity (DSTTD) algorithm.

By individually encoding data streams and then MIMO encoding the data streams, a greater throughput is achieved.

On the receive side, the decoding system includes a MIMO decoder that receives T data streams from T antennas, where T is not necessarily greater than M. The MIMO decoder decodes the T received data streams into the N received encoded data streams, which are then respectively decoded by N decoders. The N decoders correspond to the N encoders, and each of the N decoders uses the decoding algorithm corresponding to the encoding algorithm used by the corresponding encoder. A combiner combines the output of the N decoders into an output data stream.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
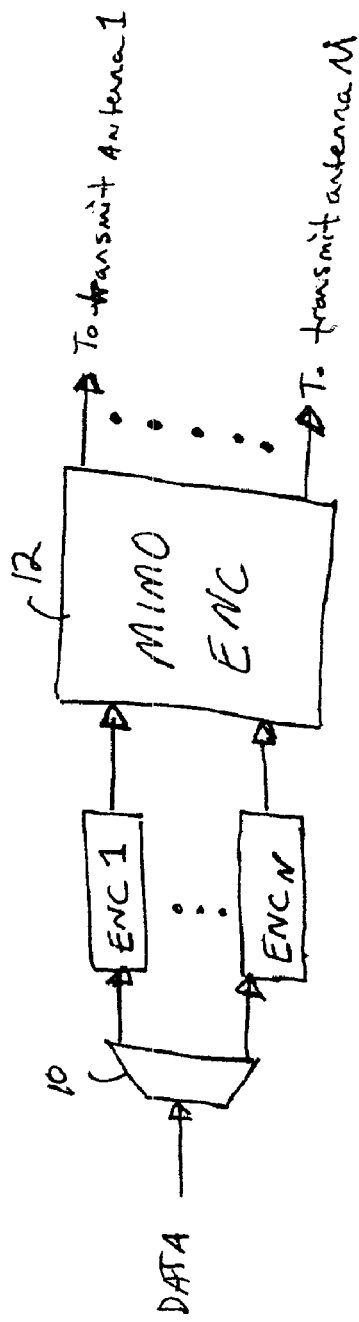
FIG. 1 illustrates an embodiment of the encoding system according to the present invention.

FIG. 1 illustrates an embodiment of the encoding system according to the present invention. As shown, a demultiplexer 10 receives data for transmission and demultiplexes the data into N data streams. N encoders ENC1–ENCN respectively receive the N data streams and encode each data stream by error-correcting code(s). The N encoders ENC1–ENCN in one embodiment use the same encoding algorithm. In another embodiment, each of the N encoders ENC1–ENCN uses a different encoding algorithm, and in yet another embodiment, at least two of the N encoders ENC1–ENCN use the same encoding algorithm, while the others of the N encoders ENC1–ENCN use different encoding algorithms. In general the N encoders ENC1–ENCN use any well-known encoding algorithm such as Turbo codes, convolutional codes, etc.

A multiple input multiple output (MIMO) encoder 12 receives the N encoded data streams output from the N encoders ENC1–ENCN and encodes the N encoded data streams into M output data streams for transmission on M antennas. The MIMO encoder 12 operates according to any well-known MIMO encoding algorithm such as space time orthogonal or quasi orthogonal block codes.

In one embodiment of the present invention, the number of encoders N is two and the number of transmit antennas M is four. Hence the MIMO encoder 12 encodes two individually encoded data streams into four output data streams. In this embodiment, the MIMO encoder 12 uses the double space time transmit diversity (DSTTD) encoding algorithm. However, it should be understood that the present invention is not limited to using two encoders and generating four output data streams. It should be further understood that the present invention is not limited to having N less than M. Instead, N can equal M or in other embodiments, N is greater than M. And, the MIMO encoding algorithm that produces the greatest throughput will vary depending on the number of encoders N and transmission antennas M. Furthermore, the encoding system designer will have to weigh the tradeoffs between encoding algorithms and the required processing resources.

In the present invention, the encoded data streams undergo MIMO encoding prior to transmission. The MIMO encoding is done in conjunction with the individual encoding performed by the N encoders ENC1–ENCN.

Figure 2:
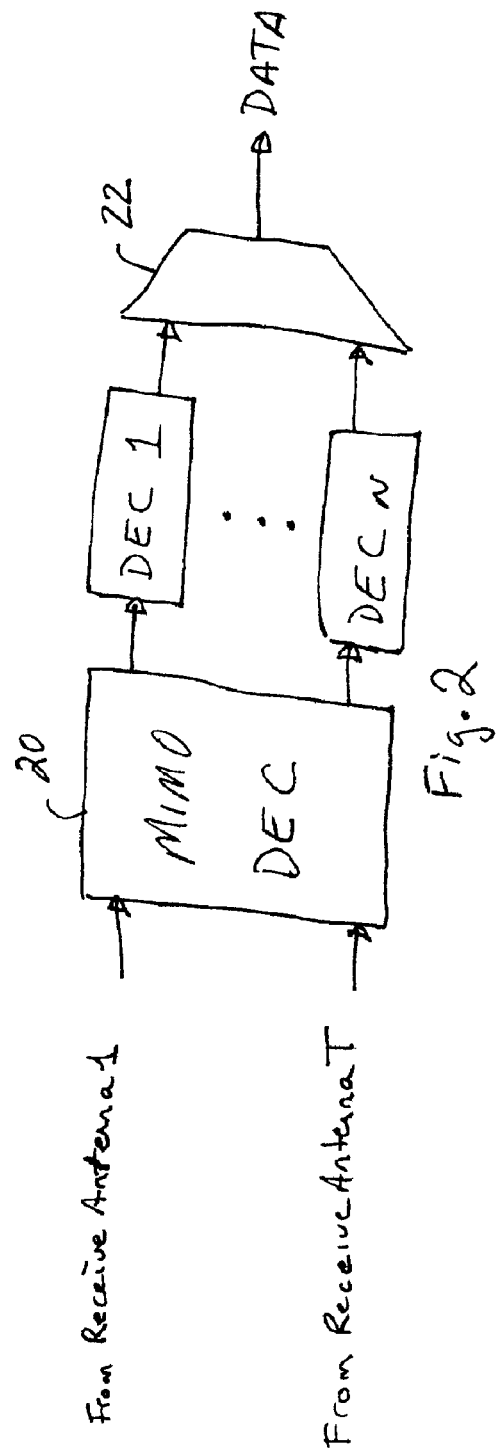
FIG. 2 illustrates an embodiment of the decoding system according to the present invention.

FIG. 2 illustrates a decoding system according to an embodiment of the present invention. As shown, a MIMO decoder 20 receives T data streams from T antennas, and decodes the T data streams into N encoded data streams. N decoders DEC1–DECN respectively decode the N received encoded data streams according to the error-correcting algorithms employed to produce the N encoded data streams. A multiplexer 22 combines the N decoded data streams to produce output data.

The N decoders DEC1–DECN correspond to the N encoders ENC1–ENCN, and each of the N decoders uses a decoding algorithm corresponding to the encoding algorithm used by the corresponding one of the N encoders ENC1–ENCN.

It should also be understood that the number of receive antennas T is not necessarily greater than the number of transmission antennas M.

The invention being thus described, it will be obvious that the same may be varied in many ways. Such variations are not to be regarded as a departure from the spirit and scope of the invention, and all such modifications are intended to be included within the scope of the following claims.

We claim:

1. An encoding system for a multi-antenna transmitter, comprising:

a feed unit receiving data and producing N data streams, where N is at least two;

N encoders, each encoder receiving a respective one of the N data streams and producing an encoded data stream;

a multiple input multiple output (MIMO) encoder receiving the N encoded data streams and encoding the N encoded data streams into M output data stream for transmission by M antennas according to the double space time transmit diversity (DSTTD) algorithm, where M is at least two.

2. The system of claim 1, wherein each of the N encoders operates according to a same encoding algorithm.

3. The system of claim 1, wherein one of the N encoders operates according to a first encoding algorithm, another of the N encoders operates according to a second encoding algorithm, and the first and second encoding algorithms are different.

4. The system of claim 1, wherein N is two and M is four.

5. The system of claim 1, wherein N equals M.

6. The system of claim 1, wherein N is less than M.

7. The system of claim 1, wherein N is greater than M.

8. The system of claim 1, wherein the feed unit is a demultiplexer.

9. A decoding system for a multi-antenna receiver, comprising:

a multiple input multiple output (MIMO) decoder receiving T data streams and decoding the T data streams into N data streams according to the double space time transmit diversity (DSTTD) algorithm;

N decoders, each decoder receiving a respective one of the N data streams and producing N decoded data streams; and a combiner combining the N decoded data streams into an output data stream.

10. The system of claim 9, wherein each of the N decoders operates according to a same decoding algorithm.

11. The system of claim 9, wherein one of the N decoders operates according to a first decoding algorithm, another of the N decoders operates according to a second decoding algorithm, and the first and second decoding algorithms are different.

12. The system of claim 9, wherein N equals M.

13. The system of claim 9, wherein N is less than M.

14. The system of claim 9, wherein N is greater than M.

15. The system of claim 9, wherein the combiner is a multiplexer.

16. An encoding and decoding system for a communication system having multi-antenna transmitter and multi-antenna receiver, comprising:

a feed unit receiving data and producing N data streams, where N is at least two;

N encoders, each encoder receiving a respective one of the N data streams and producing an encoded data stream;

a multiple Input multiple output (MIMO) encoder receiving the N encoded data streams and encoding the N encoded data streams into M output data stream for transmission by M transmit antennas according to the double space time transmit diversity (DSTTD) algorithm, where M is at least two;

a multiple input multiple output (MIMO) decoder receiving T data streams from T receive antennas and decoding the T data streams into the N encoded data streams according to the double space time transmit diversity (DSTTD) algorithm;

N decoders, each decoder receiving a respective one of the N encoded data streams from the MIMO decoder and producing N decoded data streams; and a combiner combining the N decoded data streams into an output data stream.

* * * * *